J. M. CALLOW.
FILTERING BELT.
APPLICATION FILED MAR. 4, 1916.
1,201,021.  Patented Oct. 10, 1916.
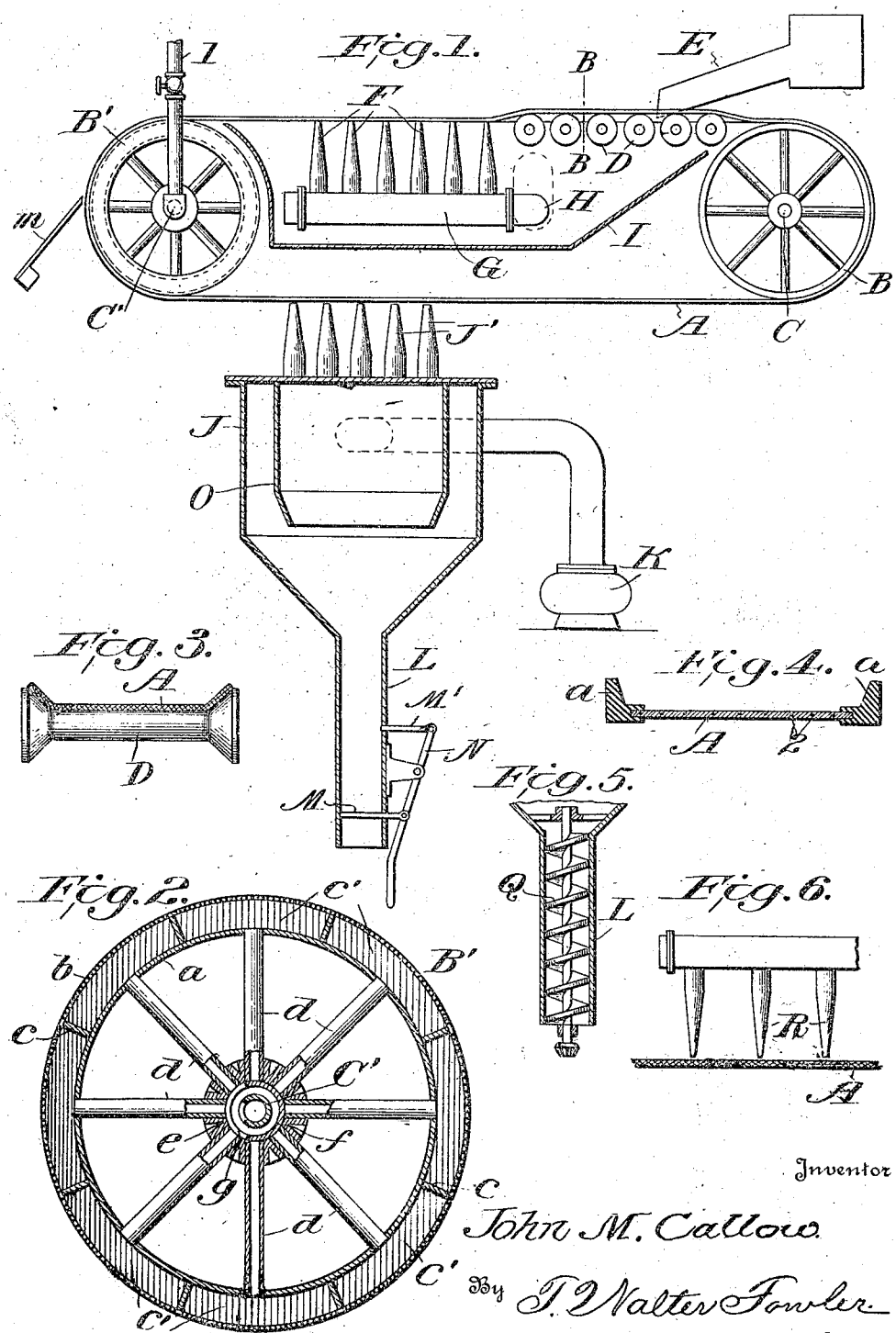
Inventor
John M. Callow
By T. Walter Fowler
Attorney

UNITED STATES PATENT OFFICE.

JOHN M. CALLOW, OF SALT LAKE CITY, UTAH, ASSIGNOR TO THE GENERAL ENGINEERING COMPANY, OF SALT LAKE CITY, UTAH, A CORPORATION OF UTAH.

FILTERING-BELT.

1,201,021.  Specification of Letters Patent.  Patented Oct. 10, 1916.

Application filed March 4, 1916. Serial No. 82,186.

*To all whom it may concern:*

Be it known that I, JOHN M. CALLOW, a subject of the King of Great Britain, residing at Salt Lake City, in the county of Salt Lake and State of Utah, have invented certain new and useful Improvements in Filtering-Belts, of which the following is a specification.

My invention relates to a machine or apparatus for separating the liquid from the solid constituents of a solution.

Primarily, my invention is designed for the handling of the filtration concentrates derived from any suitable source and which require further treatment to separate the water, or other liquid from the contained suspended solids. While the invention has been designed for use in the metallurgical art it is not limited thereto, therefore, I wish to make it clear that the invention is not to be restricted to the foregoing field of industry, but that it may be employed in the filtration of saccharine solutions, chemicals and in fact wherever the separation of a liquid from a solid is desired.

With the above and other objects in view, some of which will appear in the following description, my invention consists of the parts and the constructions, arrangements and combinations of parts which I will hereinafter describe and claim.

In the accompanying drawings forming part of this specification and in which similar reference characters indicate like parts in the several views; Figure 1 is a side elevation of a filtering machine embodying my invention. Fig. 2 is an enlarged sectional view of one of the end drums. Fig. 3 is a cross-section of the belt on the line B—B of Fig. 1. Fig. 4 is a cross-section of a belt of modified form. Figs. 5 and 6 are modifications to be referred to.

In carrying out my invention, and keeping in mind that the machine I am about to describe is designed, largely, but not exclusively, for filtering finely divided material, one type of which is represented by filtration concentrates which are derived from well known sources, it is well to here state that such solutions usually are heavily diluted, there being, ordinarily, in such solutions, about five (5) to ten (10) tons of water to every ton of solids. This large excess of water must be gotten rid of before the concentrates can be marketed.

A feature of the machine I am about to describe in more or less detail, is the ability to rapidly treat the highly diluted filtration concentrates while supplying the same continuously in a thin layer or stream, and to remove the separated solids practically as fast as they form, to thereby maintain the filtering medium substantially clean and always in workable condition.

The filtering medium shown is in the form of an endless-traveling porous belt, A, of canvas or other fibrous material, such as commonly used for filtration purposes, said belt being of any desired length and width and passing over suitable end drums, B, B', mounted on shafts, C, C', supported in any manner in or on an appropriate frame work, and within which frame work near the head end of the belt are mounted a series of troughing rollers, D, which have the function of turning up the side edges of the belt to form substantially a trough in that portion of the belt which receives the material to be treated, and which is delivered to the belt from any suitable source, through a chute, E, whose delivery edge will deposit the pulp on the belt in a uniform thin stream which extends substantially throughout the cross area of said belt, but over the side edges of the belt the pulp will not spill because of the trough-like form of the same due to the belt passing over the troughing rollers at the feed or head end of the machine. Instead of using troughing rollers, I may provide the belt with thickened upstanding side flanges, $a$, as shown in Fig. 4, to retain the pulp on the belt.

Suitably sustained in position between the going and return runs of the belt, is a number of narrow nozzles, F, placed in substantially close parallel relation and having their mouths in close proximity to, or in contact with, the under surface of the outgoing run of the porous belt, said nozzles each connecting with a common receiver or suction box, G, in which a vacuum or suction will be maintained by means of a suitable blower or air pump whose inlet pipe, H, connects with said receiver, whereby a substantially dry vacuum or suction will be maintained in the nozzles which will suck through the belt the water or liquid constituent of the pulp or material undergoing the filtering function and leave on the surface of the belt a more or less thin layer of deposited solids. This action is repeated as the belt advances the material to successive nozzles and hence when the final nozzle is passed the said deposited saturated solid material will have been robbed of most of its moisture and is in a semi-dry condition.

To catch any drippings from around the nozzles or through the belt, I may employ a catch pan, I, of some suitable construction underlying the receiver, and its attached nozzles. The solid material with which the belt is charged in passing over the nozzles is now in condition to be discharged and to facilitate the operation, the drum, B′, at the tail end of the machine and over which the porous filtering belt passes, is formed of double walls, $a$ and $b$, the outer wall being the circumference of the drum and being perforated or foraminous or being made of some suitable material sufficiently porous to permit the passage outwardly therethrough of air or other gaseous medium.

The double walls of the drum form an air chamber which is divided into cells or compartments by partitions, $c$, and to each compartment, $c'$, connects a radial pipe, $d$, which serves as a spoke of the drum and has its inner end fixed to a hub, $e$, which is revolubly mounted on a sleeve, $f$, formed with a port, $g$, and being fixed to a central pipe or hollow shaft, C′, to which is coupled or otherwise connected a supply pipe, $l$, having a controlling valve and receiving a supply of air gas or vapor under pressure from any suitable source.

Each of the radial pipes connects with the aforesaid sleeve, and the port in the latter is, preferably, long enough to connect at the same time with the inner ends of a plurality of the radial pipes, whereby during the rotation of the drum and while the portion of the belt with its deposited layer of solids is passing over and around the drum, certain of the pipes, $d$, are supplied with air or gas under pressure and this rushes into the compartments or cells, $c'$ of the drum and thence is driven outwardly through the porous or foraminous outer wall of the drum and outwardly through the porous belt and against the inner surface of the deposited or caked material on the outer surface of said belt. The result of this operation is that this internal pressure imparts a lifting effect on the caked material and loosens the adherence of the caked material to the belt. The pressure may be made even strong enough to not only loosen and further dry the caked mass but to dislodge the greater portion of the cake by the aforesaid blowing action.

In the present instance and assuming that the blowing action only further dries and loosens the caked material, I employ some suitable and well known form of scraper, $m$, adjacent the surface of the belt and adapted to positively scrape off the coarse stuff of which the cake is composed, to thereby prepare the belt for the removal of the remaining cake and substantially the cleaning of the belt and the renewing of its filtering properties by the aid of suction devices, which I will now describe.

Beneath the return run of the belt and positioned between the end drums, I arrange a closed casing, J, the interior of which is connected to a suitable suction blower or air pump, K, which when in operation tends to create a vacuum in the chamber of the casing. This casing is further provided with a series of nozzles, J′, with narrow or slitted mouths which are arranged in close proximity to the caked material on the now under side of the belt whereby as this material passes over the mouths of the nozzles, the suction induced through the nozzles, and in this instance aided by gravity, will exert such a pulling effect on the loosened caked material as will cause it to be entirely detached and drawn into the nozzles and finally into the casing. During this operation, air is also drawn through the belt and this aids the suction from below and also tends to drive the particles of caked material out of the pores of the belt, thus opening up the pores and to this extent renewing the filtering property of said belt and thereby preparing the belt for the reception of another charge of material as it again passes under the supply chute.

The solid material which is drawn into the casing by the suction devices drops into a tubular extension, L, of the conical bottom of the casing and may be delivered therefrom by the opening of any suitable valve. In the construction shown, the valve is in the form of a sliding gate, M, connected to a pivoted lever, N. If desired, there may be a second gate, M′, spaced from the first-named gate and so connected to the lever that the gates operate in unison in opposite directions; that is, when the upper gate, M′, is closed the lower gate, M, will be opened, and vice versa. Such an arrangement will enable the deposited material to drop from one gate to the other and to finally drop out of the discharge tube, without breaking the suction in the casing.

To prevent the short circuiting of the air current through the casing, I prefer to employ some form of baffle; a cylindrical or other shell, O, in the casing and extending below the inlet to the suction pipe and into which shell the inner ends of the nozzles, J′, lead, is well adapted for the foregoing purpose.

The specific character of the belt is unimportant. It may be of canvas woven with lengthwise extending wires, 2, to give added strength and to make the belt substantially unstretchable. Or, if preferred, the belt may be of woven or other metal; in fact, any of the available materials may be used which are recognized in the art as possessing satisfactory filtering properties.

The machine described is simple and effective. Suction is employed for drawing off the excess of water and depositing the solids, and suction is resorted to for the final removal of the caked material and the cleaning and renewing of the filter surface.

The belt may be rapidly operated as only a thin stream of pulp is acted on and a thin skin of solid deposited, which is taken off before the beginning of a new cycle of operation and before the belt has made a complete rotation. The supply is therefore continuous and the operation uninterrupted.

If desired, a screw conveyer, Q, may be used to discharge the solid material deposited in the casing, as shown in Fig. 5.

The caked material might also be removed from the lower return run of the belt by blast nozzles, R, instead of suction, as illustrated in Fig. 6, in which instance gravity again aids in the discharge of said material.

Having thus described my invention what I claim as new and desire to secure by Letters Patent is:

1. In a filtering machine, the combination with an endless traveling filtering belt and means for separating thereon, the liquid from the solid constituent of a solution to be filtered, of pneumatic devices for removing the caked material from the surface of the belt by exhaustion.

2. In a filtering machine, the combination with an endless traveling filtering belt and means for separating thereon, the liquid from the solid constituent of a solution to be filtered, of pneumatic devices arranged below and in proximity to the return run of the belt adapted to withdraw the caked material from the filtering surface of said belt.

3. In a filtering machine, the combination with an endless traveling filtering belt and means for separating thereon, the liquid from the solid constituent of a solution to be filtered, of suction nozzles arranged below and in proximity to the return run of the belt adapted to draw downwardly on the caked material and downwardly through the belt and thereby remove the caked material.

4. A filtering machine comprising a filtering belt and means for supplying thereto the solution to be filtered, means for pneumatically separating on one run of the belt the liquid from the solid constituent of said solution, the solid material being retained on the belt, and pneumatic means for withdrawing from the other run of said belt the solid constituent of said solution.

5. A filtering machine comprising a filtering belt and means for supplying thereto the solution to be filtered, means for separating on one run of the belt the liquid from the solid constituent of said solution, the solid material being retained on the belt, and pneumatic means for withdrawing from the other run of said belt the solid constituent of said solution.

6. A filtering machine comprising a filtering belt; means for supplying a solution to be filtered thereto; suction nozzles underlying the outgoing run of the belt and pneumatically separating thereon the liquid from the solid constituent of the solution, said solid constituent being retained on the belt in caked form; means for blowing the caked material from within while it is on the belt, and suction nozzles positioned below and proximate to the underside of the return run of the belt for pneumatically withdrawing the caked material therefrom.

7. A filtering machine comprising a porous filtering belt; means for supplying a solution to be filtered thereto; means for separating on one run of the belt the liquid from the solid constituent of the solution to be filtered, the solid material being retained on the belt; means for loosening the adherence of the solid material to the belt during the travel of said belt; and means over which the belt passes for pneumatically withdrawing the loosened solid material and inducing a downward current through the pores of the belt.

8. A filtering machine comprising a filtering belt and means for supplying thereto the solution to be filtered, means for separating on one run of the belt the liquid from the solid constituent of said solution, the solid material being retained on the belt, and pneumatic means for withdrawing from the other run of said belt the solid constituent of said solution, said last-named means comprising a casing having suction nozzles disposed adjacent the return run of the belt, a suction pipe connected to the casing, and a valve controlled tubular discharge from the bottom of the casing.

In testimony whereof I affix my signature.

JOHN M. CALLOW.